(12) United States Patent  
Dudar

(10) Patent No.: US 9,261,432 B2  
(45) Date of Patent: Feb. 16, 2016

(54) BAROMETRIC PRESSURE INFERENCE BASED ON TIRE PRESSURE

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 284 days.

(21) Appl. No.: 13/951,212

(22) Filed: Jul. 25, 2013

(65) Prior Publication Data

US 2015/0032357 A1 Jan. 29, 2015

(51) Int. Cl.

| G01M 15/04 | (2006.01) |
|---|---|
| G01M 15/09 | (2006.01) |
| F02D 41/02 | (2006.01) |
| F02D 41/22 | (2006.01) |
| F02P 5/15 | (2006.01) |
| F02M 25/08 | (2006.01) |
| B60C 23/04 | (2006.01) |

(52) U.S. Cl.
CPC ........... *G01M 15/09* (2013.01); *B60C 23/0408* (2013.01); *F02D 41/021* (2013.01); *F02D 41/222* (2013.01); *F02M 25/0809* (2013.01); *F02P 5/1502* (2013.01); *F02D 2200/703* (2013.01); *F02D 2200/704* (2013.01)

(58) Field of Classification Search
CPC ............. G01M 15/04; F02D 2200/703; F02D 2200/704; F02M 25/0809

USPC ......................................... 73/114.38, 114.39
See application file for complete search history.

(56) References Cited

U.S. PATENT DOCUMENTS

| 4,787,043 | A | 11/1988 | Zimmerman et al. |
|---|---|---|---|
| 5,954,034 | A * | 9/1999 | Takagi ........................ 123/520 |
| 6,782,874 | B1 * | 8/2004 | Matsumoto .................. 123/520 |
| 2001/0004844 | A1 * | 6/2001 | Yamaki ...................... 73/40.5 R |
| 2002/0130771 | A1 * | 9/2002 | Osborne et al. ............... 340/438 |
| 2004/0129068 | A1 * | 7/2004 | Oki et al. ...................... 73/118.1 |
| 2010/0013617 | A1 | 1/2010 | Fujita et al. |
| 2011/0308302 | A1 * | 12/2011 | Makino ......................... 73/40.7 |
| 2012/0215399 | A1 * | 8/2012 | Jentz et al. .................... 701/32.8 |
| 2012/0226424 | A1 * | 9/2012 | Adams ........................... 701/93 |
| 2012/0249319 | A1 * | 10/2012 | Schumacher et al. ........ 340/442 |

FOREIGN PATENT DOCUMENTS

| EP | 0478120 | B1 | 10/1996 |
|---|---|---|---|
| EP | 0994246 | A2 | 4/2000 |
| WO | 8911033 | A1 | 11/1989 |

* cited by examiner

*Primary Examiner* — Eric S McCall  
(74) *Attorney, Agent, or Firm* — Julia Voutyras; Alleman Hall McCoy Russell & Tuttle LLP

(57) ABSTRACT

Methods and systems for detecting barometric pressure (BP) changes based on tire pressure changes are disclosed. In one example approach, a method comprises adjusting an evaporative leak detection threshold based on a change in barometric pressure, where the change in barometric pressure is based on a tire pressure change.

20 Claims, 4 Drawing Sheets

BAROMETRIC PRESSURE INFERENCE BASED ON TIRE PRESSURE

BACKGROUND AND SUMMARY

Barometric pressure (BP) in an engine intake of a vehicle may vary due to altitude changes of the vehicle. Thus, an accurate assessment of barometric pressure changes experienced by an engine of a vehicle may be beneficial for improved operation of the vehicle. In particular, diagnostic functions, e.g., leak diagnostics in an evaporative emission control system, and engine strategies, e.g., air/fuel ratio estimates and spark timing, may benefit from having an accurate estimate of barometric pressure. For example, an evaporative leak check monitor may false fail or false pass if the BP is changing due to altitude changes or weather phenomenon. As another example, evaporative leak check detection thresholds may be adjusted in response to changes in altitude. BP determination in an engine typically relies on a barometric pressure sensor in an intake of the engine, e.g., a manifold air pressure (MAP) sensor in the engine intake.

The inventors herein have recognized various issues with approaches which rely on a MAP sensor for accurate BP determination. In particular, approaches which utilize a MAP sensor for determining barometric pressure rely on part throttle or full or wide open throttle conditions, e.g., cruising or going up a hill, in order accurately determine BP. However, during closed throttle conditions, e.g., during downhill driving, or if a fault is present in a MAP sensor, the MAP sensor may not be able to be used to infer BP. During these conditions, engine operation and diagnostic routines may become degraded since an accurate determination of BP is not possible. For example, lack of altitude detection can result in alpha/beta errors in an evaporative diagnostic monitor (ideally, the monitor should abort execution if a significant altitude change is detected). In some approaches a global positioning system (GPS) may be included in a vehicle to determine altitude changes. However, not all vehicles have GPS technology and there may be remote geographical areas where GPS reception is not available. Thus GPS technology for altitude determination may be unreliable or costly.

In one example approach, in order to at least partially address these issues, a method for detecting barometric pressure changes in a vehicle with an engine comprises adjusting an evaporative leak detection threshold based on a change in barometric pressure, where the change in barometric pressure is based on a tire pressure change. For example, a tire pressure change may be determined via one or more tire pressure sensors and used to indicating an altitude change based on the tire pressure change. Various engine operating conditions and diagnostic routines may then be adjusted based on the BP change detected via the tire pressure change. For example, an evaporative leak detection monitor may be discontinued in response to a change in altitude determined from the tire pressure change. As another example, an engine air/fuel ratio may be adjusted in response to a change in altitude determined from the tire pressure change.

In this way, tire pressure sensors coupled to one or more tires of a vehicle may be utilized to determine changes in barometric pressure during fault conditions of a MAP sensor, e.g., during closed throttle conditions. Since such tire pressure sensors are ubiquitous, such an approach provides a consistent and accurate approach to BP determination so that vehicle operation may be optimally adjusted during all conditions. Utilizing readily available tire pressure sensors, altitude changes can be detected and used to increase robustness of diagnostic routines and engine air/fuel control.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above of in any part of this disclosure.

BRIEF DESCRIPTIONS OF THE DRAWINGS

DETAILED DESCRIPTION

Figure 1:
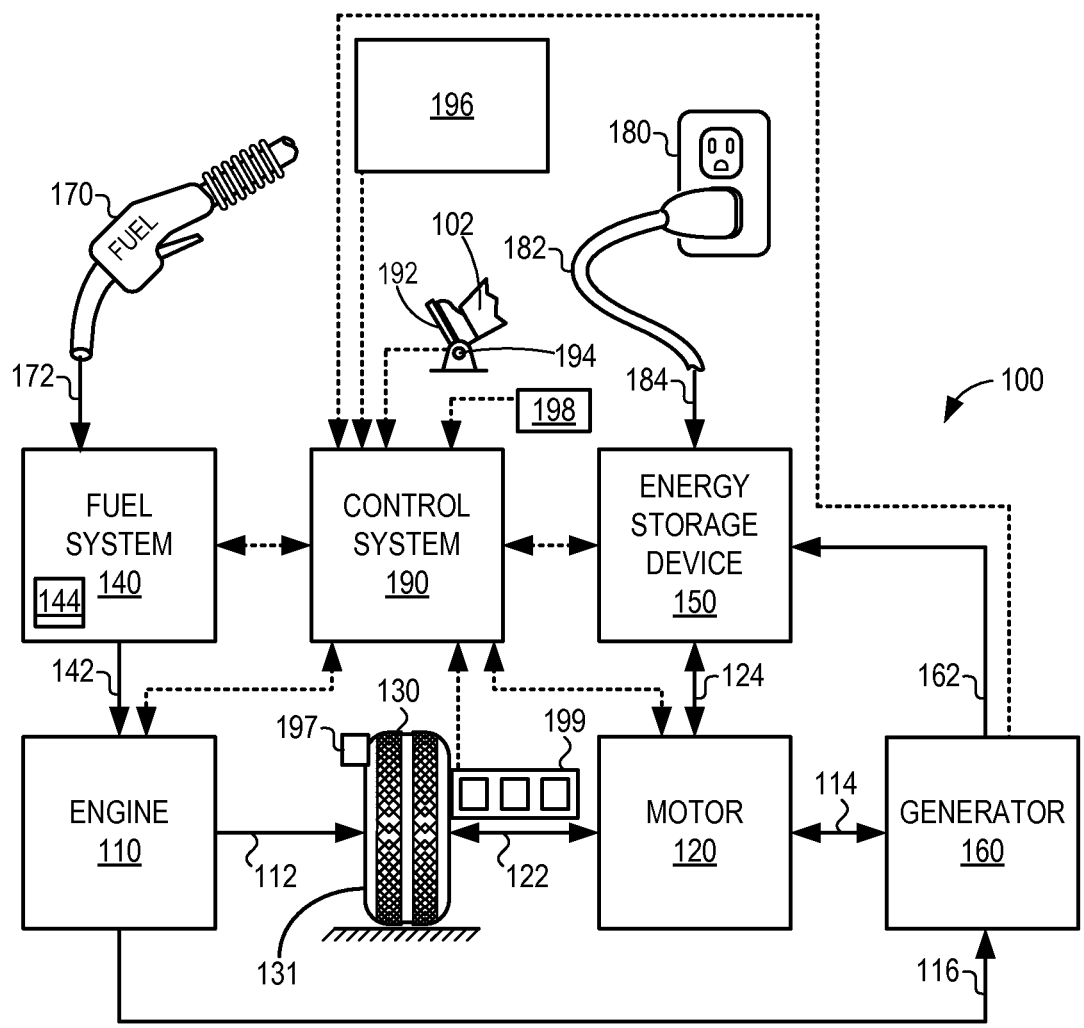
FIG. 1 shows a schematic diagram of an example vehicle propulsion system.
Figure 3:
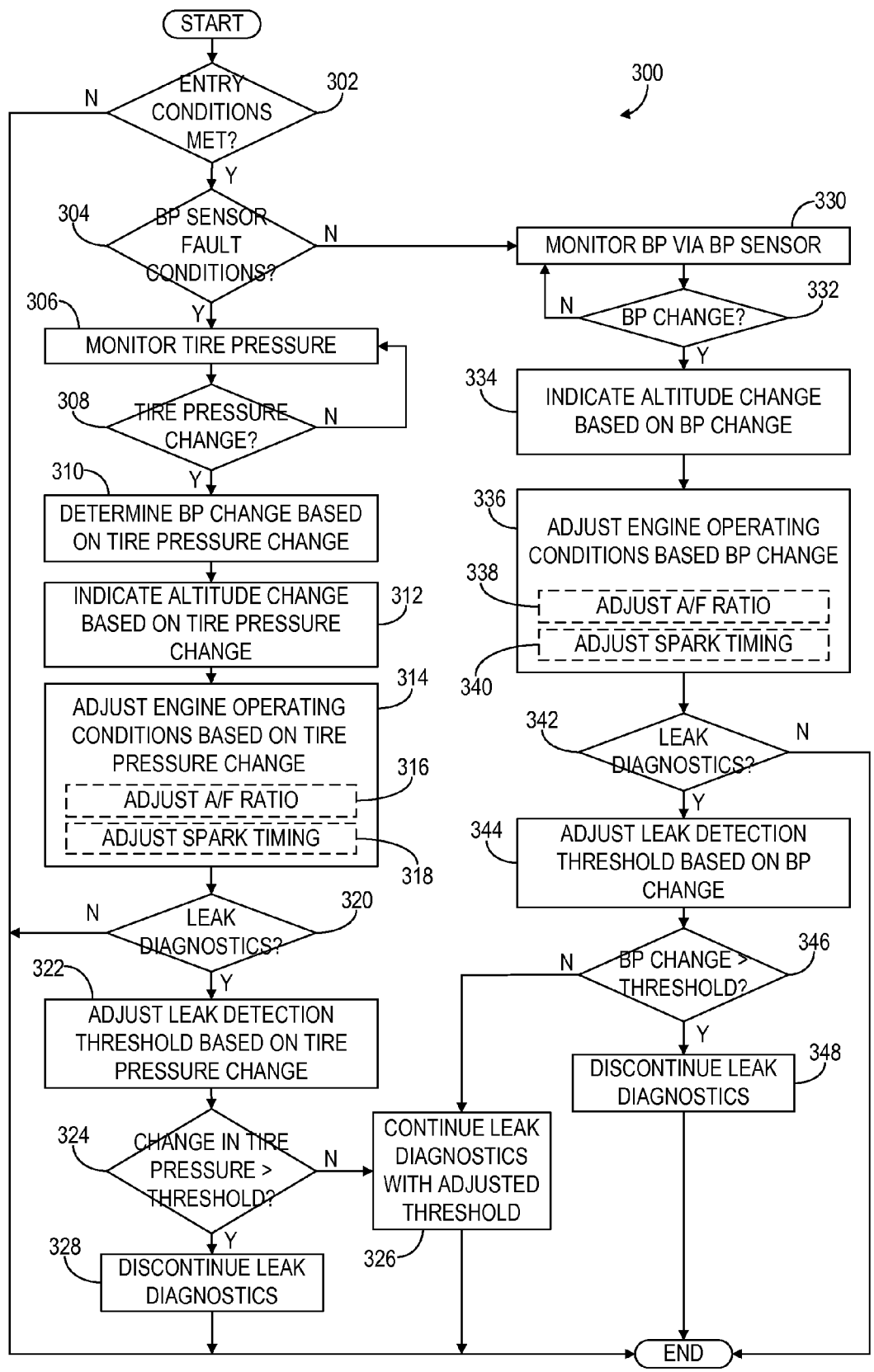
FIG. 3 shows an example method for determining barometric pressure (BP) changes based on tire pressure and adjusting engine operation based on the BP changes in accordance with the disclosure.
Figure 4:
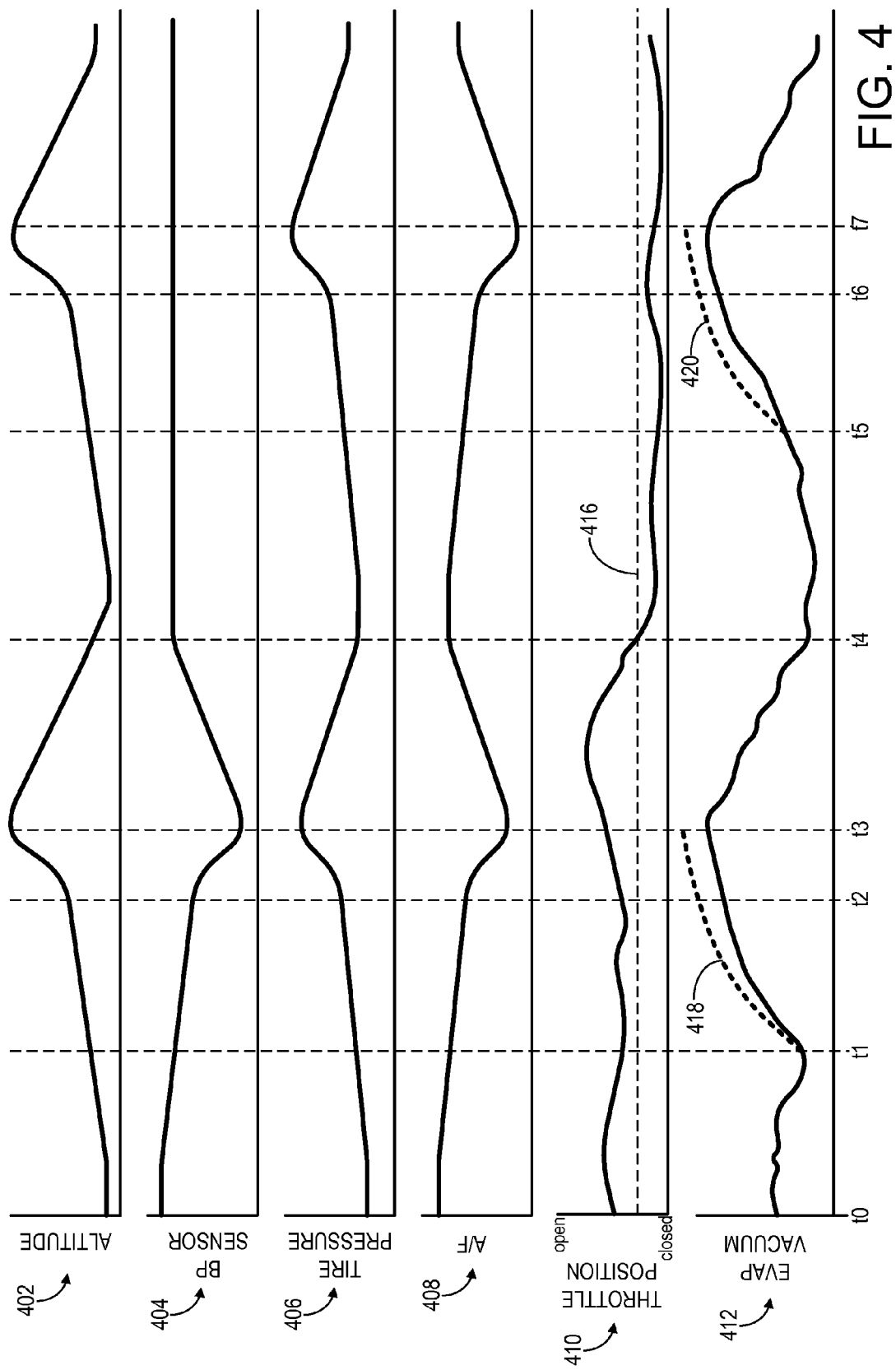
FIG. 4 illustrates an example method for determining barometric pressure (BP) changes based on tire pressure and adjusting engine operation based on the BP changes in accordance with the disclosure.

The following description relates to systems and methods for determining barometric pressure based on tire pressure in a vehicle, such as the example vehicle system of FIG. 1. As remarked above, an accurate assessment of barometric pressure changes experienced by an engine of a vehicle may be beneficial for improved operation of the, such as the example engine system shown in FIG. 2. As shown in FIGS. 3 and 4, changes in tire pressure, e.g., as determined via one or more sensors coupled to one or more tires of the vehicle, may be used to detect changes in barometric pressure, e.g., due to altitude changes of the vehicle. These tire pressure changes may be used to detect BP changes even during conditions when a barometric pressure sensor in an intake of the engine is unreliable, e.g., during closed throttle conditions or if the sensor is degraded. Since such tire pressure sensors are ubiquitous, such an approach provides a consistent and accurate approach to BP determination so that vehicle operation may be optimally adjusted during all conditions.

Turning now to the figures, FIG. 1 illustrates an example vehicle propulsion system 100. For example, vehicle system 100 may be a hybrid electric vehicle or a plug-in hybrid electric vehicle. However, it should be understood that, though FIG. 1 shows a hybrid vehicle system, in other examples, vehicle system 100 may not be a hybrid vehicle system and may be propelled solely via engine 110.

Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

In some examples, vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flow of FIG. 3, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

One or more tire pressure monitoring sensors (TPMS) may be coupled to one or more tires of wheels in the vehicle. For example, FIG. 1 shows a tire pressure sensor 197 coupled to wheel 130 and configured to monitor a pressure in a tire 131 of wheel 130. As described in more detail below, tire pressure sensors can be used as an auxiliary source for determining barometric pressure instead of or in addition to a barometric pressure sensor coupled to an intake of the engine. For example, when climbing altitude, the pressure in the tire increases since there is less atmospheric pressure outside. Likewise, when descending a hill, the tire pressure decreases as the atmospheric pressure outside increases. Hence, when inferred BP based on a BP sensor in the engine intake is not available or goes bad, one or more tire pressure sensors can act as a secondary BP source.

Figure 2:
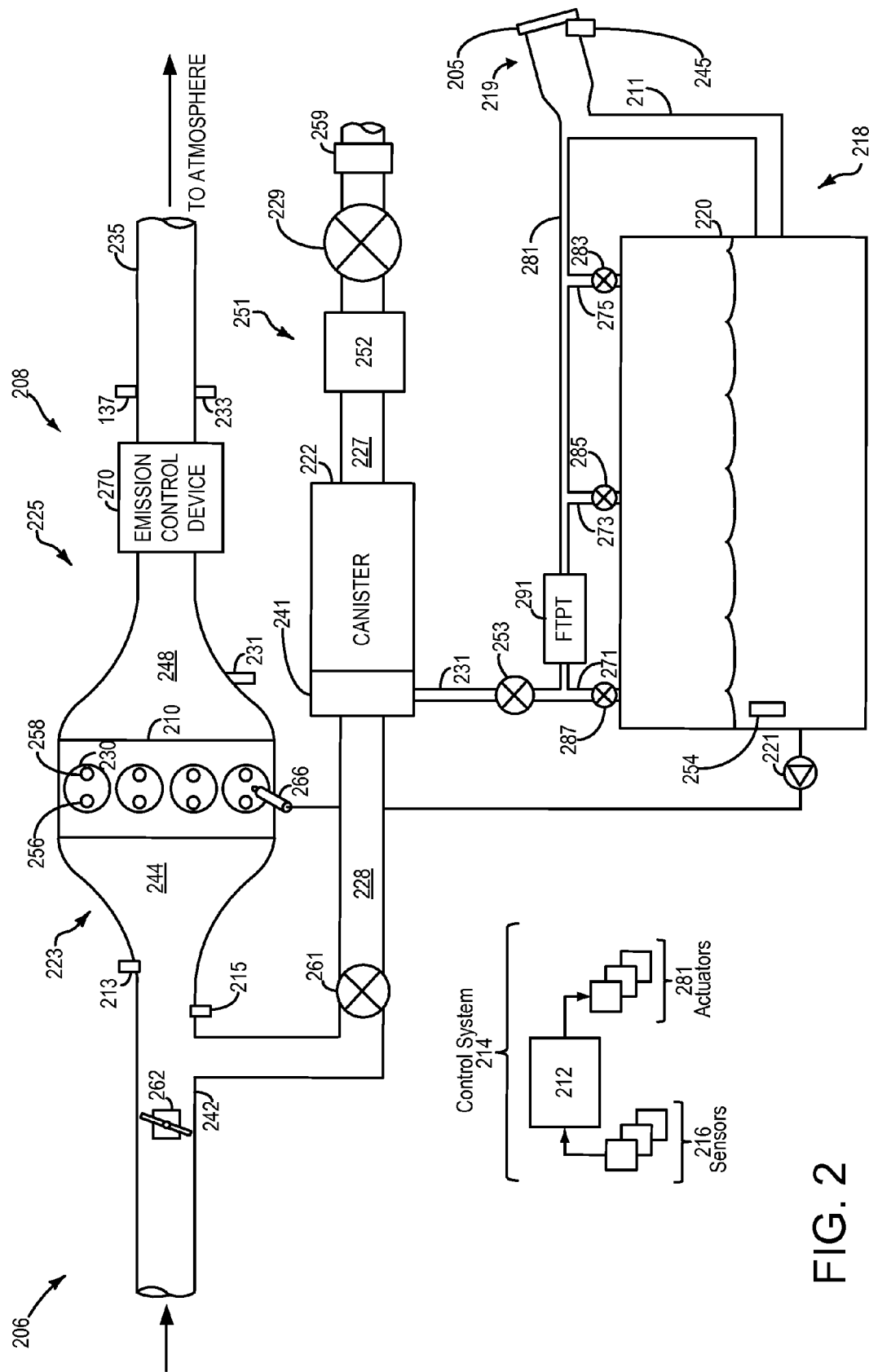
FIG. 2 shows a schematic diagram of a vehicle engine system including an evaporative emission control system.

FIG. 2 shows a schematic depiction of a vehicle engine system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. Each cylinder may include at least one intake valve 256 and at least one exhaust valve 258 coupled to an intake camshaft and exhaust camshaft, respectively. In some examples, the intake and exhaust valves may be electronically controlled hydraulic valves that direct high pressure engine oil into a camshaft phaser cavity in an arrangement known as variable camshaft timing (VCT). These oil control solenoids may be bolted into the cylinder heads towards the front of the engine near camshaft phasers. A powertrain control module (PCM) may transmit a signal to the solenoids to move a valve spool that regulates the flow of oil to the phaser cavity. The phaser cavity changes the valve timing by rotating the camshaft slightly from its initial orientation, which results in the camshaft timing being advanced or retarded. The PCM adjusts the camshaft timing depending on factors such as engine load and engine speed (RPM). This allows for more optimum engine performance, reduced emissions, and increased fuel efficiency compared to engines with fixed camshafts. VCT may be used on either the intake or exhaust camshaft. In some examples, both the intake and exhaust camshafts may have VCT, an arrangement designated as Ti-VCT.

The engine 210 includes an engine intake 223 and an engine exhaust 225. The engine intake 223 includes a throttle 262 fluidly coupled to the engine intake manifold 244 via an intake passage 242. The engine intake may include various sensors. For example, a mass air flow (MAF) sensor 213 may be coupled to the engine intake to determine a rate of air mass flowing through the intake. Further, a barometric pressure sensor 215 may be included in the engine intake. For example, barometric pressure sensor 215 may be a manifold air pressure (MAP) sensor and may be coupled to the engine intake downstream of throttle 262. During some conditions, barometric pressure sensor 215 may be used to determine BP changes, e.g., due to altitude changes of the vehicle. However, as remarked above, barometric pressure sensor 215 may rely on part throttle or full or wide open throttle conditions, e.g., when an opening amount of throttle 262 is greater than a threshold, in order accurately determine BP. However, during closed throttle conditions, e.g., when an opening amount of throttle 262 is less than the threshold, or if a fault is present in the barometric pressure sensor 215, the sensor may not be able to be used to infer BP. During such conditions, one or more tire pressure sensors may be used to determine BP changes as described in more detail below.

The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system.

Vapors generated in fuel system 218 may be routed to an evaporative emissions control system 251 which includes a fuel vapor canister 222 via vapor recovery line 231, before being purged to the engine intake 223. Fuel vapor canister 222 may include a buffer or load port 241 to which fuel vapor recovery line 231 is coupled. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275. Further, in some examples, one or more fuel tank isolation valves may be included in recovery line 231 or in conduits 271, 273, or 275. Among other functions, fuel tank isolation valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283, and/or conduit 231 may include an isolation valve 253. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211. A fuel tank pressure transducer (FTPT) 291, or fuel tank pressure sensor, may be included between the fuel tank 220 and fuel vapor canister 222, to provide an estimate of a fuel tank pressure. As another example, one or more fuel tank pressure sensors may be located within fuel tank 220. Further, in some example, a temperature sensor 254 may also be included in fuel tank 220.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake 244 is provided to the fuel vapor canister for purging. In some examples, vent line 227 may include an air filter 259 disposed therein upstream of a canister 222.

In some examples, flow of air and vapors between canister 222 and the atmosphere may be regulated by a canister vent valve 229. Canister vent valve may be a normally open valve so that fuel tank isolation valve 253 may be used to control venting of fuel tank 220 with the atmosphere. For example, in hybrid vehicle applications, isolation valve 253 may be a normally closed valve so that by opening isolation valve 253, fuel tank 220 may be vented to the atmosphere and by closing isolation valve 253, fuel tank 220 may be sealed from the atmosphere. In some examples, isolation valve 253 may be actuated by a solenoid so that, in response to a current supplied to the solenoid, the valve will open. For example, in hybrid vehicle applications, the fuel tank 220 may be sealed off from the atmosphere in order to contain diurnal vapors inside the tank since the engine run time is not guaranteed. Thus, for example, isolation valve 253 may be a normally closed valve which is opened in response to certain conditions, for example, in response to a fueling event. In some example, in PHEV applications, the fuel vapor canister may only adsorb refueling vapors. In this example, diurnal and running loss vapors may be trapped in the sealed fuel tank by use of a vapor isolation valve FTIV 253.

In some applications, an evaporative leak detection module (ELCM) 252 may be included in emission control system 251, e.g., in a vent path 227 of fuel vapor canister 222, which may be used for generating pressure in the emission control system for leak diagnostics. For example, a pump in the module may evacuate a small volume of air from the emission control system through a reference orifice in the module to obtain a reference pressure. The pump may then be operated to generate decreasing pressure in the emission control system which may be monitored by a controller and leaks may be indicated in response to the pressure in the emission control system remaining above an adjusted reference pressure, where the adjusted reference pressure is based on an actual size or diameter of the reference orifice in the ELCM and the barometric pressure. In other examples, vacuum from the engine intake or other suitable vacuum source in the engine may be used to generate vacuum or pressure changes in the evaporative emission control system during leak diagnostics. During leak testing, pressure changes in the emission control system may be monitored and compared with a threshold or expected pressure change to determine if a leak is present. This threshold or expected pressure change in the emission control system may be adjusted based on barometric pressure, e.g., as determined via tire pressure as described below.

The vehicle system 206 may further include a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 237, pressure sensor 291, temperature sensor 254, barometric pressure sensor 215, and tire pressure sensor 197. Other sensors such as pressure, temperature, air/fuel ratio, and composition sensors may be coupled to various locations in the vehicle system 206. As another example, the actuators may include fuel injector 266, throttle 262, fuel tank isolation valve 253, ELCM 252, and purge valve 261. The control system 214 may include a controller 212. The controller may receive input data from the various sensors, process the input data, and trigger the actuators in response to the processed input data based on instruction or code programmed therein corresponding to one or more routines. An example control routine is described herein with regard to FIG. 3.

FIG. 3 shows an example method 300 for determining barometric pressure (BP) changes based on tire pressure and adjusting engine operation based on the BP changes. For example, one or more tire pressure sensors, e.g., tire pressure sensor 197, may be used during certain conditions to detect changes in BP due to altitude changes of the vehicle. In some examples, BP determination based on tire pressure may be used instead of or in addition to a barometric pressure sensor 215 coupled in an engine intake.

At 302, method 300 includes determining if entry conditions are met. Entry conditions may include various vehicle operating conditions. In some examples, determining if entry conditions are met may include determining if the engine is in operation. However, in other examples, method 300 may be performed even when the engine is not in operation. For example, BP may be determined based on tire pressure while a hybrid vehicle is in operation in an engine-off mode. As still another example, tire pressure may be used to determine BP during engine-off conditions when the vehicle is turned off or at rest so that various engine-off diagnostic routines which rely on accurate BP determination may be performed. In some examples, entry conditions may include any vehicle or engine condition in which an altitude detection system, e.g., a GPS system, is unavailable or provides inaccurate altitude or BP data.

In some examples, during certain conditions, tire pressure may be used to determine BP in addition to a barometric pressure sensor determination of BP. For example, during part or wide open throttle conditions when an opening amount of the intake throttle is greater than a predetermined threshold amount, BP may be determined from both tire pressure and BP sensor readings. However, in other examples, if the BP sensor is not degraded during part or wide open throttle conditions when an opening amount of the intake throttle is greater than the predetermined threshold amount, then BP may be determined solely based on BP sensor measurements. In any case, during fault conditions in a BP sensor, e.g., during closed throttle conditions when an opening amount of the throttle is less than the predetermined threshold or if a fault exists in the BP sensor, then tire pressure may be solely used to determine BP.

Thus, if entry conditions are met at 302, method 300 proceeds to 304 to determine if BP sensor fault conditions are present. BP sensor fault conditions may include any conditions in which a BP sensor is incapable of providing sufficiently accurate BP readings. For example, BP fault conditions may include a fault or degradation in the BP sensor or may include closed throttle conditions wherein an opening amount of the throttle is less than a threshold. For example, this threshold may correspond to an opening amount of the throttle which provides sufficient intake air, e.g., an amount of intake air greater than a threshold, to the BP sensor for BP determination. Such closed throttle conditions may include vehicle idling conditions or conditions when an engine speed or load is less than a threshold, e.g., if the vehicle is going downhill. If BP sensor fault conditions are present at 304, method 300 proceeds to 306.

At 306, method 300 includes monitoring tire pressure. For example, one or more tire pressure sensors coupled to one or more tires of the vehicle may be used to monitor tire pressure. Tire pressure sensors may be used in vehicle to provide an indication to a vehicle operator of tire pressures in the tires so that the vehicle operator may be alerted if pressure in the tires becomes too low so that air may be added to the tires. For example, if the tire pressure in a tire becomes too low then an indication may be sent to a display in the vehicle to alert the driver. These tire pressure sensors may additionally be used to determine BP changes, e.g., due to altitude changes of the vehicle. For example, when climbing altitude, the pressure in the tire increases since there is less atmospheric pressure outside. Likewise, when descending a hill, the tire pressure decreases as the atmospheric pressure outside increases.

Thus, at 308, method 300 includes determining if a tire pressure change occurs. Determining if a tire pressure change occurs may include determining if a threshold amount of change in tire pressure occurs. For example, during vehicle operation over different terrain at a given altitude, there may be slight variations in tire pressure, e.g., as the vehicle travels over bumps or uneven terrain in a road, etc. Thus, a predetermined tire pressure change threshold may be used to determine if a change in tire pressure is indicative of an altitude change rather than just normal variation due to movement of the vehicle at a given altitude.

If a tire pressure change does not occur at 308, method 300 continues monitoring tire pressure at 306. However, if a tire pressure change occurs at 308, method 300 proceeds to 310. At 310, method 300 includes determining a BP change based on the tire pressure change. For example, the tier pressure change detected by the tire pressure sensors may be correlated with an associated change in BP. An amount of tire pressure change may be linearly correlated with a BP change. For example, if the tire pressure increases by an amount then the BP may decrease by the same amount. Conversely, if the tire pressure decreases by an amount then the BP may increase by the same amount. This change in BP may then be correlated to a change in altitude as described below.

At 312, method 300 includes indicating an altitude change based on the tire pressure change. For example, an increase in altitude may be indicated in response to an increase in tire pressure. As another example, a decrease in altitude may be indicated in response to a decrease in tire pressure. In some examples, indicating an altitude change may include updating a display device in the vehicle to notify a vehicle operator of the altitude change. Further, indicating an altitude change may include updating an altitude and/or BP parameter in an engine controller so that various engine operating parameters may be adjusted accordingly.

At 314, method 300 includes adjusting engine operating conditions based on the tire pressure change. As remarked above, various engine and vehicle operations may depend on an accurate measurement of BP for optimal operation. Thus, various engine and vehicle operations may be adjusted responsive to the change in barometric pressure corresponding to the change in tire pressure. For example, method 300 may include adjusting an air/fuel (A/F) ratio or an air/fuel ratio control at 316 and/or adjusting a spark timing at 318. For example, a target air/fuel ratio for the engine may be decreased in response to an increase in altitude or decrease in BP. As another example, a target air/fuel ratio for the engine may be increased in response to a decrease in altitude or increase in BP. Further, in some examples, a more aggressive spark timing may be employed in response to a decrease in altitude or increase in BP.

Leak diagnostics, e.g., leak tests in the evaporative emission control system, may be periodically performed. Thus, at 320, method 300 includes determining if leak diagnostics are being performed. If leak diagnostics are being performed at 320, method 300 proceeds to 322. At 322, method 300 includes adjusting a leak detection threshold based on the tire pressure change. The leak detection threshold may be an expected pressure change in the emission control system for leak detection. For example, during a leak test, vacuum may be provided to the emission control system and corresponding pressure changes monitored. If vacuum in the emission control system increases to the leak detection threshold then a no leak condition may be indicated. However, if the vacuum does not increase to the leak detection threshold for a predetermined duration then a leak may be indicated. This leak detection threshold may depend on BP, thus the leak detection threshold is adjusted based on the BP determined from the change in tire pressure For example, the evaporative leak detection threshold may be decreased in response to an increase in tire pressure. As another example, the evaporative leak detection threshold may be increased in response to a decrease in tire pressure.

However, during leak diagnostics, if an altitude of the vehicle increases quickly so that a rate of BP change is greater than a threshold then leak diagnostics may be unreliable so that during such conditions, the leak test may be aborted. Thus, At 324, method 300 includes determining if a change in tire pressure is greater than a threshold during the leak diagnostics. Determining if a change in tire pressure is greater than a threshold may include determining if a rate of change in tire pressure is greater than a threshold which indicates that a rate of BP change is greater than a threshold so that the leak test should be aborted. If a change in tire pressure is not greater than a threshold during the leak diagnostics, method 300 proceeds to 326 to continue the leak diagnostics with the leak detection threshold adjusted based on the change in tire pressure. However, if a change in tire pressure is greater than the threshold during the leak diagnostics, then method 300 proceeds to 328 to discontinue the leak diagnostics. Discontinuing leak diagnostics may include deactivation of a leak test pump, e.g., ELCM 252, for example.

Returning to step 304, in some examples, if BP sensor fault conditions are not present, then the BP sensor 215 may be used to determine BP instead of or in addition to tire pressure. For example, the BP sensor may be used to determine BP during engine operating conditions when the engine intake throttle position is greater than a threshold, where the threshold is a throttle opening amount which is large enough to guarantee a sufficient amount of intake air reaching the BP sensor for BP determination. Thus, if BP sensor fault conditions are not present at 304, then method 300 proceeds to 330

At 330, method 300 includes monitoring BP via a BP sensor in the intake of the engine. For example BP sensor 215 may be used to monitor BP pressure. At 332, method 300 includes determining if a BP change, as detected via the BP sensor, occurs. If a BP change does not occur at 332, method 300 continues monitoring BP via the BP sensor. However, if a BP change occurs at 332, method 300 proceeds to 334.

At 334, method 300 includes indicating an altitude change based on the BP change. For example, an increase in altitude may be indicated in response to a decrease in BP. As another example, a decrease in altitude may be indicated in response to an increase in BP. As remarked above, in some examples, indicating an altitude change may include updating a display device in the vehicle to notify a vehicle operator of the altitude change. Further, indicating an altitude change may include updating an altitude and/or BP parameter in an engine controller so that various engine operating parameters may be adjusted accordingly.

At 336, method 300 includes adjusting engine operating conditions based on the BP change. Various engine and vehicle operations may be adjusted responsive to the change in barometric pressure as measured by the BP sensor. For example, method 300 may include adjusting an air/fuel (A/F) ratio or an air/fuel ratio control at 338 and/or adjusting a spark timing at 340. For example, a target air/fuel ratio for the engine may be decreased in response to an increase in altitude or decrease in BP. As another example, a target air/fuel ratio for the engine may be increased in response to a decrease in altitude or increase in BP. Further, in some examples, a more aggressive spark timing may be employed in response to a decrease in altitude or increase in BP whereas a less aggressive spark timing may be employed in response to an increase in altitude or decrease in BP.

At 342, method 300 includes determining if leak diagnostics are being performed. If leak diagnostics are being performed at 342, method 300 proceeds to 344. At 344, method 300 includes adjusting a leak detection threshold based on the BP change determined via the BP sensor. For example, the evaporative leak detection threshold may be decreased in response to a decrease in BP. As another example, the evaporative leak detection threshold may be increased in response to an increase in BP.

As remarked above, during leak diagnostics, if an altitude of the vehicle increases quickly so that a rate of BP change is greater than a threshold then leak diagnostics may be unreliable so that during such conditions, the leak test may be aborted. Thus, At 346, method 300 includes determining if a change in BP is greater than a threshold during the leak diagnostics. Determining if a change in BP is greater than a threshold may include determining if a rate of change in BP is greater than a threshold so that the leak test should be aborted. If a change in BP is not greater than a threshold during the leak diagnostics, method 300 proceeds to 326 to continue the leak diagnostics with the leak detection threshold adjusted based on the change in BP. However, if a change in BP is greater than the threshold during the leak diagnostics, then method 300 proceeds to 348 to discontinue the leak diagnostics. Discontinuing leak diagnostics may include deactivation of a leak test pump, e.g., ELCM 252, for example.

FIG. 4 illustrates an example method, e.g., method 300 described above, for determining barometric pressure (BP) changes based on tire pressure and adjusting engine operation based on the BP changes. Graph 402 in FIG. 4 shows vehicle altitude versus time. Graph 404 shows measurements of BP sensor 215 versus time. Graph 406 shows tire pressure, e.g., as measured by tire pressure sensor 197, versus time. Graph 408 shows an engine air/fuel ratio (A/F) versus time. Graph 410 shows the position of intake throttle 262 versus time. Graph 412 shows an amount of vacuum in evaporative emission control system (EVAP) 251 versus time.

Between times t0 and t4 in FIG. 4, the engine is in operation with a throttle position greater than a threshold 416. During these conditions, the BP sensor may be functional to determine BP pressure changes due to vehicle altitude changes. Between times t0 and t1, the altitude of the vehicle increases so that BP as measured by the BP sensor decreases and tire pressure increases. During this time, BP may be determined via one or both of the BP sensor and the tire pressure and the engine air/fuel ratio adjusted accordingly. For example, the air/fuel ratio may decrease as altitude increases so that a commanded air/fuel ratio in the engine may be correspondingly increased.

At time t1, a leak test is initiated so that vacuum is provided to the evaporative emission control system for detecting leaks. During this vacuum increase in the emission control system, the vacuum or pressure in the system is monitored and compared with a leak detection threshold 418. Since the altitude of the vehicle is increasing between times t1 and t2, the leak detection threshold may be correspondingly decreased due to the decrease in BP as determined from the BP sensor and/or tire pressure. However, between times t2 and t3, while the leak diagnostics are being performed, the vehicle altitude increases abruptly so that the rate of BP decrease is above a threshold at which leak diagnostics become degraded. In response to this sharp decrease in BP as determined via the BP sensor and/or tire pressure, leak diagnostics are terminated at time t3 so that vacuum is no longer supplied to the emission control system leading to a decrease in vacuum in the system.

Between times t3 and t4, the vehicle altitude decreases so that the BP increases and the tire pressure decreases. One or both of tire pressure and BP sensor readings may be used during this time to determine BP for adjustment of engine operation. For example, since BP increases from time t3 to t4, the air/fuel ratio in the engine may increase so that a commanded air/fuel ratio may be decreased to compensate for the BP change.

At time t4, throttle position falls below the threshold 416 so that BP sensor reading become degraded or unresponsive. After time t4, the engine is in operation with a throttle position less than the threshold 416. During these conditions, the BP sensor may not be functional to determine BP pressure changes due to vehicle altitude changes. Between times t4 and t5, the altitude of the vehicle increases so that tire pressure increases. This tire pressure increase may be used to determine an amount of BP decrease so that the engine air/fuel ratio can be adjusted accordingly.

At time t5, a leak test is initiated so that vacuum is provided to the evaporative emission control system for detecting leaks. During this vacuum increase in the emission control system, the vacuum or pressure in the system is monitored and compared with a leak detection threshold 420. Since the altitude of the vehicle is increasing between times t5 and t6, the leak detection threshold may be correspondingly decreased due to the decrease in BP as determined from the tire pressure. However, between times t6 and t7, while the leak diagnostics are being performed, the vehicle altitude increases abruptly so that the rate of tire pressure increase is above a threshold indicating that the rate of BP decrease is such that the leak diagnostics become degraded. In response to this sharp decrease in BP as determined via the tire pressure change, leak diagnostics are terminated at time t7 so that vacuum is no longer supplied to the emission control system leading to a decrease in vacuum in the system.

After time t7, the vehicle altitude decreases so that the tire pressure decreases. This decrease in tire pressure may be used to determine a corresponding increase in BP for adjustment of engine operation. For example, since BP increases after time t7, the air/fuel ratio in the engine may increase so that a commanded air/fuel ratio may be decreased to compensate for the BP change.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle with an engine, comprising:
adjusting an evaporative leak detection threshold based on a change in tire pressure, wherein the change in tire pressure is based on a change in barometric pressure.

2. The method of claim 1, wherein adjusting the evaporative leak detection threshold includes decreasing the evaporative leak detection threshold in response to an increase in tire pressure, the method further comprising generating an indication of a leak based on a comparison of a parameter with the evaporative leak detection threshold.

3. The method of claim 1, wherein adjusting the evaporative leak detection threshold includes increasing the evaporative leak detection threshold in response to a decrease in tire pressure.

4. The method of claim 1, wherein the tire pressure change is determined via one or more tire pressure sensors.

5. The method of claim 1, further comprising, adjusting an air/fuel ratio measurement in the engine responsive to the change in tire pressure which is based on the change in barometric pressure.

6. The method of claim 1, further comprising discontinuing an evaporative leak detection monitor in response to a change in tire pressure greater than a threshold.

7. The method of claim 1, wherein adjusting the evaporative leak detection threshold based on the change in barometric pressure where the change in barometric pressure is based on the tire pressure change is performed in response to fault conditions of a barometric pressure sensor coupled to the engine.

8. The method of claim 7, wherein the fault conditions include closed throttle engine operating conditions.

9. The method of claim 1, further comprising indicating an altitude change based on a tire pressure change.

10. The method of claim 9, wherein indicating the altitude change based on the tire pressure change includes indicating an increase in altitude in response to an increase in tire pressure.

11. The method of claim 9, wherein indicating the altitude change based on the tire pressure change includes indicating a decrease in altitude in response to a decrease in tire pressure.

12. The method of claim 9, further comprising discontinuing an evaporative leak detection monitor in response to a change in altitude greater than a threshold change, where the change in altitude is based on the tire pressure change.

13. A method for a vehicle with an engine, comprising:
adjusting engine operation responsive to a change in tire pressure, wherein the change in tire pressure is based on a change in barometric pressure, the tire pressure change determined via one or more tire pressure sensors.

14. The method of claim 13, wherein adjusting engine operation includes adjusting engine spark timing and engine air-fuel ratio.

15. The method of claim 13, wherein adjusting engine operation includes adjusting an evaporative leak detection threshold based on the change in barometric pressure.

16. The method of claim 13, further comprising indicating an altitude change based on the tire pressure change and adjusting engine operation based on the indicated altitude change.

17. The method of claim 13, further comprising discontinuing an evaporative leak detection monitor in response to a change in tire pressure greater than a threshold.

18. The method of claim 13, further comprising:
in response to an engine intake throttle position greater than a threshold, adjusting engine operation responsive to a change in barometric pressure, where the change in barometric pressure is based on a barometric pressure sensor coupled to an intake of the engine; and
in response to the engine intake throttle position less than the threshold, adjusting engine operation responsive to a change in barometric pressure, where the change in barometric pressure is based on the tire pressure change determined via one or more tire pressure sensors.

19. A vehicle system, comprising:
an engine;
a barometric pressure sensor in an intake of the engine;
one or more tire pressure sensors coupled to one or more tires of the vehicle;
an intake throttle in the intake of the engine; and
a controller having instructions executable to:
in response to an opening amount of the intake throttle greater than a threshold while the engine is in operation, adjust engine operation responsive to a change in barometric pressure, where the change in barometric pressure is determined via the barometric pressure sensor; and
in response to an opening amount of the intake throttle less than the threshold while the engine is in operation, adjust engine operation responsive to a change in barometric pressure, where the change in barometric pressure is determined via the one or more tire pressure sensors coupled to one or more tires of the vehicle.

20. The system of claim 19, wherein adjusting engine operation includes adjusting one or more of an engine spark timing, an engine air-fuel ratio, and an evaporative leak detection threshold.

* * * * *